Aug. 19, 1947.    E. D. VANCIL ET AL    2,425,903
LUBRICATING SYSTEM FOR MILLING MACHINES
Filed March 29, 1944    5 Sheets-Sheet 5

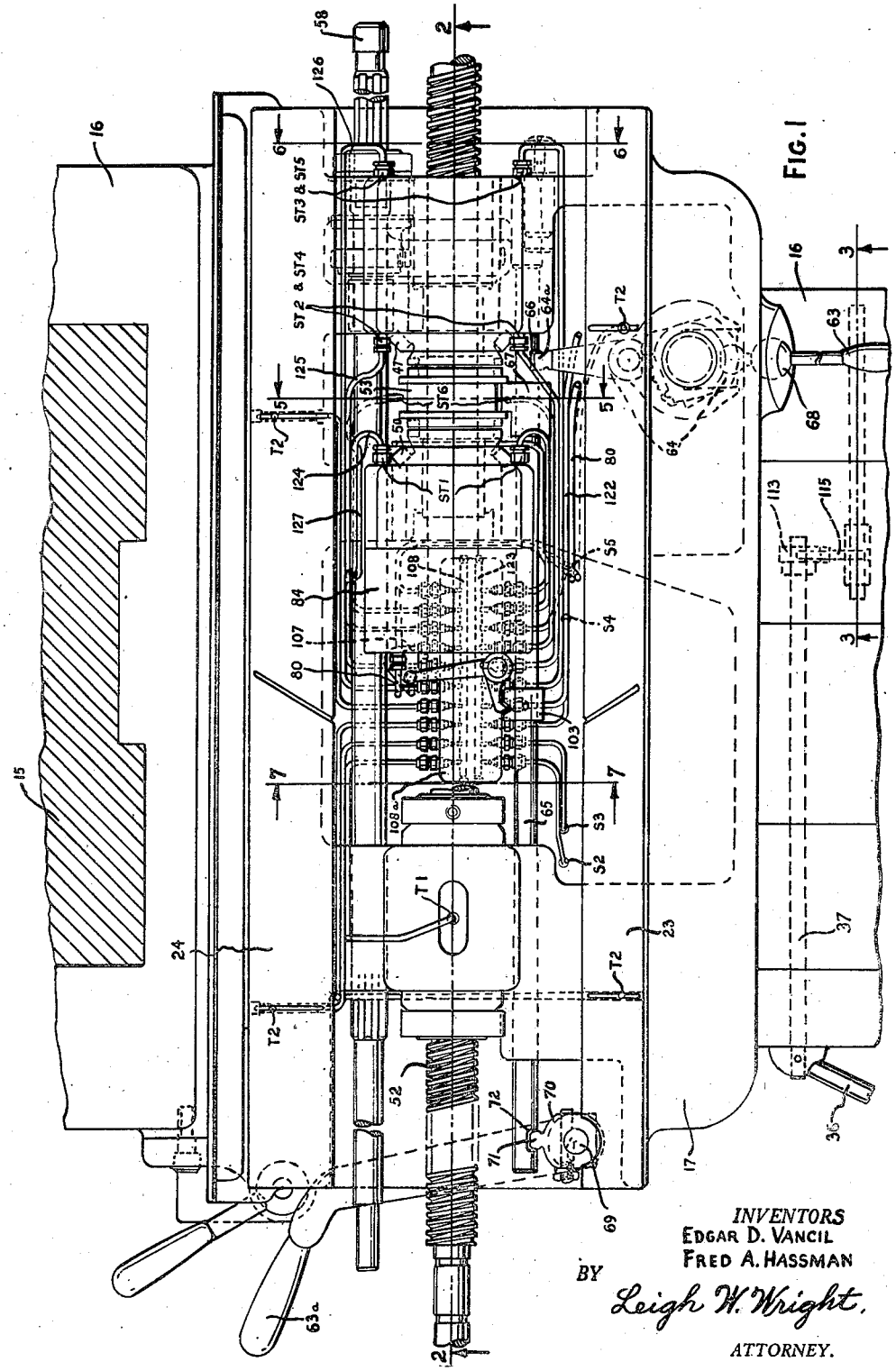

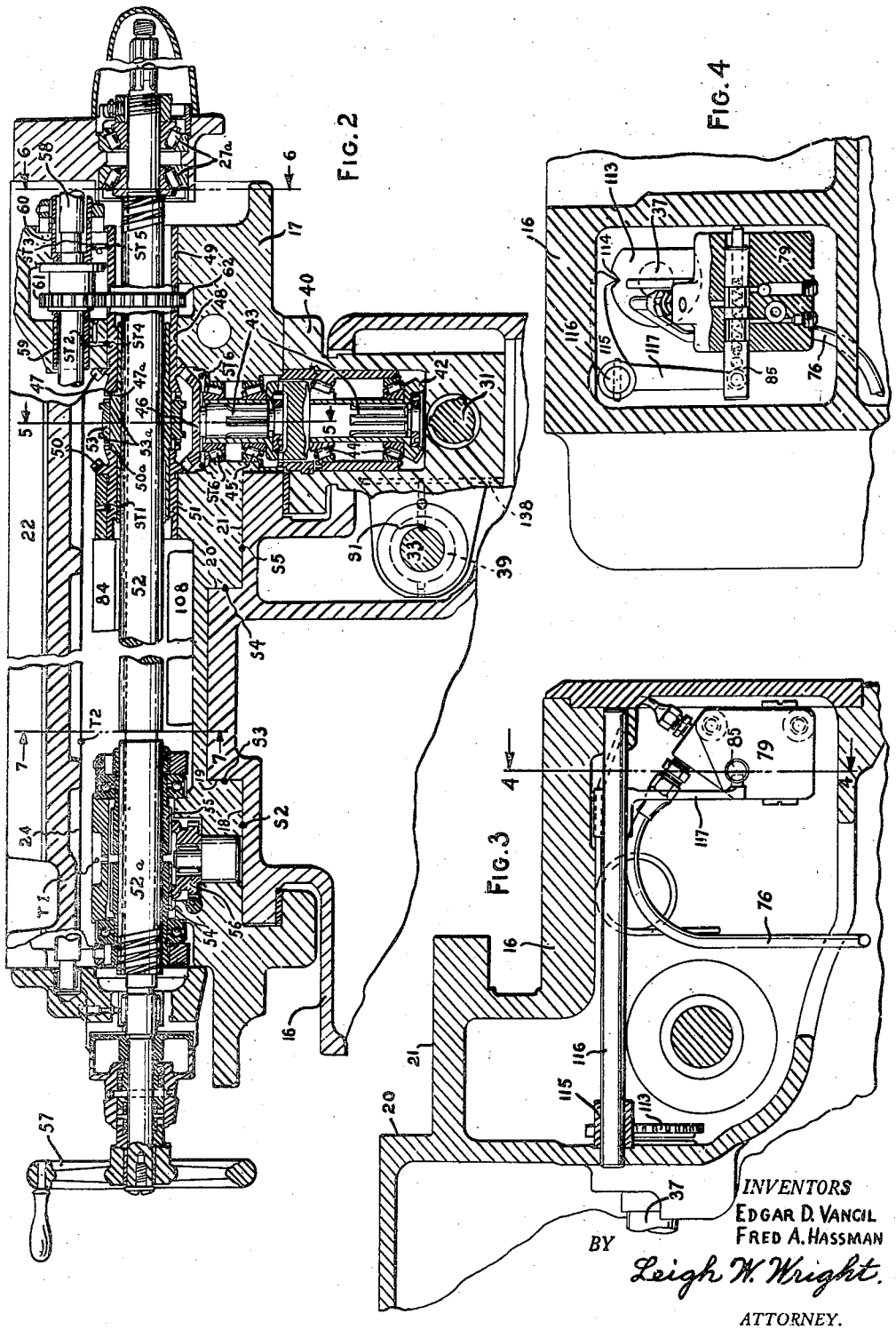

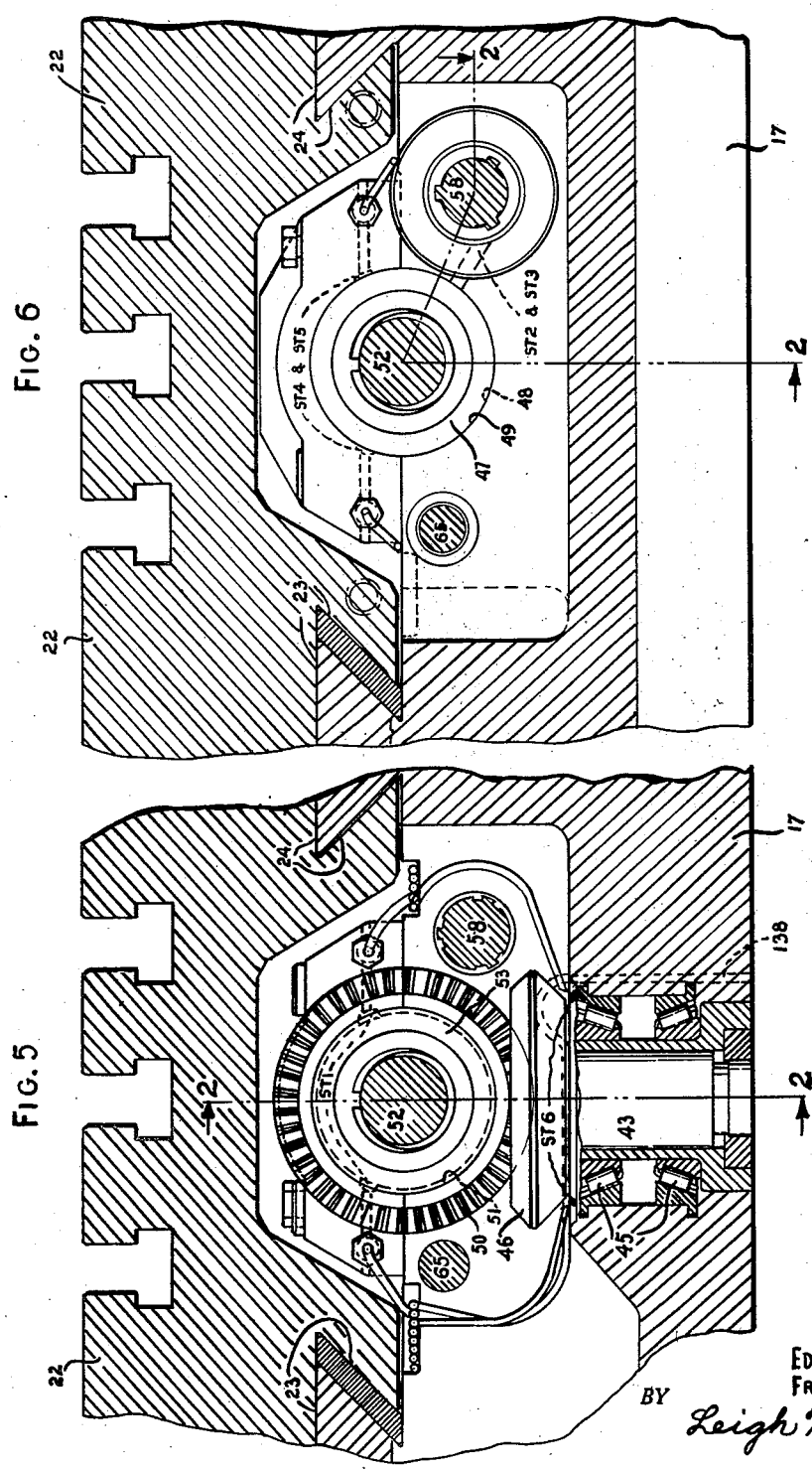

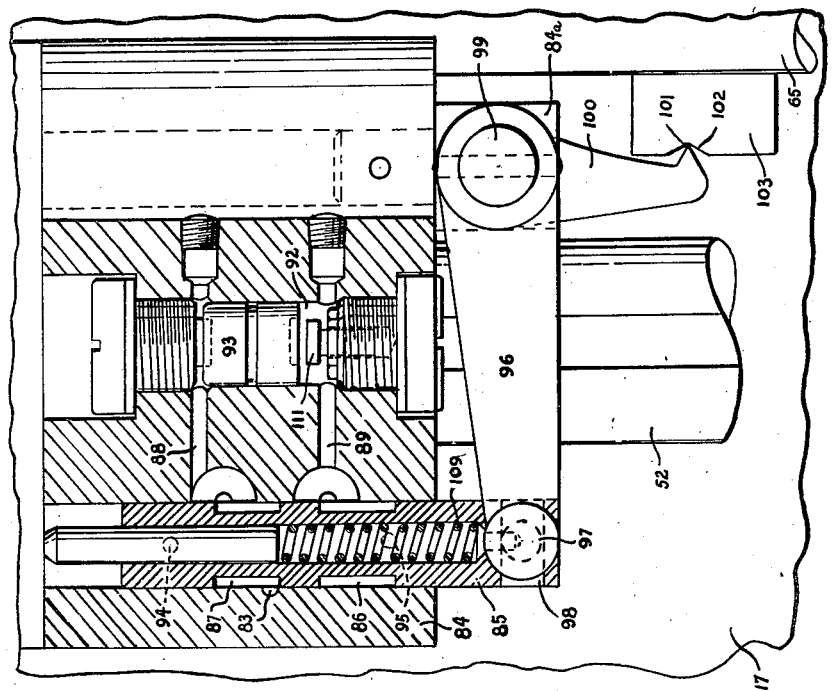

INVENTORS
EDGAR D. VANCIL
FRED A. HASSMAN
BY
Leigh W. Wright
ATTORNEY.

Patented Aug. 19, 1947

2,425,903

UNITED STATES PATENT OFFICE 2,425,903

LUBRICATING SYSTEM FOR MILLING MACHINES

Edgar D. Vancil and Fred A. Hassman, Cincinnati, Ohio, assignors to The Cincinnati Milling Machine Co., Cincinnati, Ohio, a corporation of Ohio Application March 29, 1944, Serial No. 528,645

14 Claims. (Cl. 90—21)

This invention pertains to improvements in lubricating systems and more particularly to improvements designed to render the system more economical in the use of lubricant.

It is an object of this invention to provide a lubricating system of this general type which is adapted to provide intermittent lubricant supply under pressure to the various operating parts of a machine in direct proportion to the extent of operation of such parts.

A further object is to provide a lubricating system for the moving parts of a machine which is rendered operative, by the devices which control movement of the machine parts, so as to supply lubricant only to the particular parts selected for operation.

A still further object is to provide an improved lubricating system which is especially suitable and economical for lubricating a transmission system having a main transmission and a plurality of branch transmissions arranged to be connected in power transmitting relationship therewith whereby a branch transmission is only lubricated upon power connection to the main transmission, but the main transmission is lubricated when any of the branch transmissions are power connected to it.

A still further object is to provide, in a milling machine having a movable saddle and work table and a control lever for each to initiate or arrest their respective movements, a lubricating system which is rendered effective by the movement of each of said control levers so as to distribute lubricant selectively only to the particular machine parts utilized in actuating either the saddle or the table; and in which system common machine parts utilized to actuate both the saddle and table receive lubricant when either of said control levers is operated.

And a still further object is to provide a non-return type lubricating system for a milling machine which selectively supplies lubricant to actuating parts thereof only when they are actually operating so as to prevent needless supply and waste of lubricant to parts of the machine not actually in operation.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a fragmentary plan view, partly in section showing a saddle of a typical knee and saddle type milling machine mounted on the knee with the work table removed from the saddle to more clearly show the operating mechanism and the lubricant distributing system incorporating the features of this invention.

Figure 2 is an enlarged fragmentary longitudinal section on the line 2—2 of Figures 1, 5, 6, and 7.

Figure 3 is a fragmentary vertical section on the line 3—3 of Figure 1.

Figure 4 is a fragmentary vertical section on the line 4—4 of Figure 3.

Figure 5 is a fragmentary transverse section through the table and saddle on the line 5—5 of Figures 1 and 2.

Figure 6 is a fragmentary transverse section through the table and saddle on the line 6—6 of Figures 1 and 2.

Figure 7 is a fragmentary transverse section through the table and saddle on the line 7—7 of Figures 1 and 2.

Figure 8 is a diagrammatic section on the line 8—8 of Figure 7.

Figure 9 is a diagram showing the lubricating system applied to the saddle and table mechanism.

Figure 10 is a diagram showing the transmission gearing for driving the saddle and table.

In the actuation of movable machine tool elements, such as the saddle and table members of a knee and column type milling machine, there is utilized a driving transmission which has certain portions thereof which act as the main or common driving means for effecting movements in each of the members. The saddle is mounted on guideways on the knee of the milling machine for transverse movement thereon while the work table is mounted for longitudinal movement on guideways formed on the saddle. Suitable control means, cooperating with the power transmission for actuating the saddle and table, are provided which render one or the other of these machine members operable in either direction on their respective guideways.

In order to maintain the high degree of accuracy and operating efficiency of a modern machine tool such as a milling machine, it is necessary to provide adequate lubrication for both the power transmission for actuating the movable members and also adequate lubrication to the guideways upon which the machine members move. Such lubrication must be automatic in its nature so that whenever the machine is operated the appropriate parts receive the necessary lubrication without attention on the part of the operator.

Because of the nature of the machine elements such as the saddle and table of a knee and column type milling machine, it is not practicable to provide a complete circuitous path for the lubricating fluid of the driving transmission and the slideways so that a continuous supply of fluid could be at all times circulated over these portions. As a result it is necessary to rely on a non-return type of lubricating system to supply these portions and as a result it is desirable to prevent excessive loss of lubricant by providing a novel lubricating system which selectively applies lubricant just to those members which are actually operating. Thus, the common driving transmission gearing which must operate when either the saddle or the table are put in operation must receive lubricant in both instances whenever they are put in operation. Furthermore, the guideways for the saddle only require lubrication when the saddle is moving and similarly the guideways for the table only require lubrication when the table is moving. A system is, therefore, provided which supplies lubricant whenever the machine is put in operation in such a way that common operating members are supplied with lubricant whenever they are put in operation while intermittently operating portions of the machine are only supplied with lubricant when they are actually operating.

More specifically, as an exemplary disclosure of a machine tool structure incorporating the features of this novel lubricating system, there is illustrated, only so far as is required to disclose this invention, a typical knee and column type milling machine having a frame or column 15, Figure 1, upon which is mounted the knee 16 in a conventional manner for knee and column type milling machines. On top of the knee is mounted the saddle 17 on appropriate guideways 18, 19, 20 and 21 for horizontal transverse movement on the knee. On top of the saddle is mounted the work table 22 on appropriate guideways 23 and 24 for longitudinal movement thereof.

The saddle and table may be actuated in feeding and rapid traversing movements by any conventional power transmission actuated by a prime mover contained in the column 15, but since the specific details of this invention do not involve the above-mentioned structure, further description thereof is not deemed necessary. It is sufficient to state, referring particularly to Figures 9 and 10, that power from the prime mover and associated transmission in the column may be applied to the input shaft 25 journaled in the knee 16 having fixed thereon a gear 26 which drives a double gear comprising the gears 27 and 28 journaled on a suitable shaft 29 in the knee 16. The gear 28 drives a gear 30 fixed on the table drive shaft 31 journaled appropriately in the knee 16 while the gear 27 drives a gear 32 journaled on the cross feed or saddle actuating screw 33. The gear 30 in turn, drives another gear 34 journaled on the cross feed screw 33 so that the gear 34 rotates in the opposite direction from the gear 32. A suitable disconnecting reversing clutch 35 slidingly keyed to the cross feed screw 33 may be clutched with one or the other of the gears 32 or 34 to effect stopping or reversal of rotation of the cross feed screw 33.

The clutch 35 may be actuated by the saddle control lever 36 mounted on a suitable rock shaft 37 journaled in the knee 16 having an appropriate arm 38, Figure 10, engaging the clutch 35 whereby movement of the lever 36 to one side or the other or to its intermediate stop position the driving power to cross feed screw 33 may be readily controlled. The cross feed screw 33 operates in a cross feed nut 39, Figure 2, carried in the bracket 40 rigidly fixed to the saddle 16 so that rotation of the screw 33 in one direction or the other effects transverse movements of the saddle 16 on the guideways 18, 19, 20 and 21 of the knee.

The work table 22 is also actuated from the input drive shaft 25, Figure 10, through the gear 30 fixed on the drive shaft 31 which has a splined driving portion 31a operating in a mating splined bore 31b of the bevel gear 41 which is journaled against axial movement in the bracket 40 of the saddle 16. The bevel gear 41, in turn, drives a bevel gear 42, Figures 2 and 9, carried on a pair of interconnected vertical shafts 43 appropriately journaled in suitable bearings 44 and 45 in the bracket 40 and the saddle 16 respectively. On the upper end of the upper shaft 43 is formed a bevel gear 46 which drives a bevel gear 47 having an integral sleeve portion journaled in bearings 48 and 49 formed in the saddle 17. The bevel gear 46 also drives a mating bevel gear 50 journaled in the bearing 51 formed in the saddle 17. Each of these bevel gears 47 and 50 may be respectively coupled in driving relationship with or disconnected from driving the table feed screw 52 by means of a suitable clutch 53 which is keyed in sliding driving relationship with the table feed screw 52 but which may be shifted to engage its clutch teeth 53a, Figure 2, with the mating clutch teeth 47a or 50a of the respective bevel gears 47 and 50 to thereby effect rotation of the table screw 52 from the input drive shaft 25.

The table feed screw journaled against axial movement by suitable bearings 27a carried in the table 22, Figure 2, has a threaded portion 52a which operates in a suitable nut means which may consist of a pair of rotatable nuts 54 and 55 cooperating with an interconnecting gear 56 which functions in the nature of a backlash eliminator of a type for example as shown in Patent 2,191,131, issued February 20, 1940. A conventional type of nut means carried by the saddle 17 and cooperating with the threaded portion 52a of the table feed screw 52 may be utilized since the specific structure of this nut means forms no part of this invention. The screw 52 may be adjusted manually by means of a suitable hand wheel 57 fixed to the outer end thereof.

In order to provide facilities for driving auxiliary equipment and attachments which may be mounted on the work table, an attachment drive shaft 58 is provided which is journaled in suitable bearings 59 and 60, Figure 2, in the knee 16 and upon which shaft is mounted a gear 61 which is driven from a gear 62 formed on the sleeve portion of the bevel gear 47 so that the shaft 58 may be driven from the power input shaft 25 from the transmission and prime mover in the column.

The actuating clutch 53 for controlling the operation of the table feed screw 52 may be shifted to its various positions by means of the table control lever 63 mounted on the saddle, Figure 1, having an appropriate linkage connection, indicated generally at 64 which is connected by means of a ball end portion 64a operating in a slot 66 formed in the shifter rod 65 slidably mounted in the knee. On this shifter rod 65 is shifter fork 67 which engages the clutch spool 53 so that axial movement of the rod 65 effected by swinging the lever 63 on its pivotal mounting 68 will effect the engagement or disengagement of the clutch 53. A duplicate rear control lever 63a may be provided, if desired, mounted on a rock shaft 69 in the saddle 17 and providing it with an integral lever 70 having a ball end portion 71 operating in a slot 72 of the shifter rod 65.

It is obvious that in order to provide efficient operation of the above mechanism lubrication must be supplied to the power transmission gearing such as that diagrammatically illustrated in Figure 10 to the slideways 18, 19, 20, 21 for the saddle and to the slideways 23, and 24 for the table. More specifically, it is desirable to supply lubrication at the points ST1, ST2, ST3, ST4, ST5 and ST6 to provide adequate lubrication for the driving transmission gearing actuated by the shaft 25 for driving the saddle and table in their respective movements. Noting particularly Figure 2, it will be seen that these points of lubrication serve to supply the respective bearings 51, 59, 60, 48 and 49 provided in the saddle 17 for the associated driving bevel gears for the table feed screw and the mounting for the auxiliary drive shaft associated with the screw. It is furthermore obvious, referring to Figure 10, that these parts mounted in the above-mentioned journal bearings and in the bearings 44 and 45 are continuously running during the operation of the machine whenever the shaft 25 is being driven to effect movement of either the saddle or the table. It is, therefore, necessary to supply lubricant to these above-mentioned points ST1 to ST6 inclusive, Figures 2 and 9, whenever the saddle or table are put in motion by operating the respective control levers 36 or 63.

It is also necessary to provide lubricant at the points S1 for adequate lubrication of the cross feed nut 39 and the screw 33 operating therein and to the guideways 18, 19, 20 and 21 at the lubricating points S2 to S5 respectively as best seen in Figures 2 and 9. These points of lubrication S1 to S5 obviously need lubrication only when the saddle is being actuated in transverse movement on the knee by manipulating the control lever 36.

The work table 22 requires lubrication of its guideways 24 at the points T2, best seen in Figures 1 and 9 and at the point T1 of engagement of the table actuating screw 52 with the actuating nut means 54—55 carried in the saddle 17. These points T1 and T2 require lubrication only when the work table 22 is being actuated by manipulation of the control lever 63.

The lubrication system is arranged to be operated in such a way as to only distribute lubrication to the appropriate parts of the machine which are actually operating in accordance with the movements of the levers 36 and 63. When the lever 36 for effecting movement of the saddle is operated lubricant will be supplied to the points ST1 to ST6 inclusive, and to the point S1 through S5 inclusive. When the control lever 63 is operated to effect table movement the points ST1 and ST6 inclusive are again supplied with lubricant and the points T1 and T2 receive lubricant at the same time. Thus, both levers 36 and 63 effect the common lubrication of the driving transmission exemplified by the points ST1 to ST6 inclusive while control lever 36 can only effect lubrication of the points S1 to S5 inclusive and manipulation of control lever 63 can only effect supply of lubricant to the points T1 and T2.

The specific arrangement of the lubricating system for carrying out these principles of operation is best seen in Figure 9 and comprises a lubricating supply pump 73 mounted in the knee and driven by any suitable means (not shown). This pump receives its supply of lubricant through a suction line 74 from a suitable reservoir 75 formed in the knee 16. Lubricating fluid is transmitted under pressure through the line 76 having one branch line 77 connected to a pressure port 78 of the saddle lubricating control valve 79 mounted in the knee 16, as shown in Figures 3 and 4. A second branch line 80 has a flexible portion 81 connecting with a pressure line 82 in the saddle 17 which in turn connects with a pressure port 83 of the table lubricating control valve 84 mounted on the saddle 17. A branch line 76a connected to a relief valve 76b maintains proper operating pressure in line 76. Each of these control valves 79 and 84 are of identical construction so that a detailed description of one of them will suffice for both. Referring particularly to Figures 8 and 9, each of the control valves 79 and 84, has a control valve 85 having annular grooves 86 and 87 cooperating with the pressure port 83, or the pressure port 78 in the case of the valve 79. The annular grooves of the plunger 85 cooperate with ports 88 and 89 connected through appropriate passageways 90 and 91 with a metering cylinder 92 in which is carried the metering plunger or piston 93. A pair of outlet ports 94 and 95 are provided in connection with the annular grooves 86 and 87 of the plunger 85.

The plunger 85 is connected for reciprocation by the movement of the lever 63 through a lever 96, Figure 8, having a pin 97 fixed in its outer end operating in a slot 98 formed in the plunger 85, the lever 96 being pivotally mounted on a suitable rock shaft 99 carried in a block 84a fixed on the valve block 84. Fixed on the rock shaft 99 is a detent arm 100 having a point 101 operating in a V-cam groove 102 formed in a cam 103 fixed to the slidable shifter rod 65 in such a way that axial movement of the rod 65 in controlling the table reversing clutch 53 effects rocking motion of the level 96 to reciprocate the plunger 85.

The functioning of metering control valve 84 and the similar valve 79 is such that when the control lever, for example, the control lever 63, is in neutral position fluid pressure from the port 83 will pass through annular groove 86 to the port 89 and the line 91 to one end of the metering cylinder 92 to hold its piston 93 shifted to one side as shown in Figure 9. In so having moved the piston 93 lubricating fluid has been forced out through the line 90, the port 88, annular groove 87 to the port 94 into the discharge line 104 and then out through the line 105 and the check valve 106 and the line 107 to the table movement lubricant distributor manifold 108 formed in the manifold block 108a mounted on the saddle, Figures 1, 2, and 7. When the control lever 63 is moved to either of its operative positions the plunger 85 is moved by means of the compression spring 109 so as to then connect pressure port 83, Figure 9, through annular groove 87, to the port 88 through line 90 to the metering cylinder 92 to force its piston 93 in the opposite direction, thus displacing lubricant fluid out through the line 91 to the port 89 of the valve 84, then out through the annular groove 86 to the port 95 to the line 110 which is in communication with the line 105 to therefore again transmit fluid to the distributor 108.

Since the movement of the metering piston 93 is of limited amount, movement of the control valve through the medium of the lever 63 will only effect a predetermined displacement of lubricant fluid into the distributor 108 with each movement of the lever. By regulating the extent of movement of the plunger 93, as by means of a stop screw 111, the amount of fluid displaced into the distributor 108 with each movement of the handle 63 may be thus regulated to desired amounts.

The plunger 85 in the valve 79 is actuated by movement of the control lever 36 for the saddle movements as best illustrated in Figures 1, 3, and 4, in which the rock shaft 37 having the saddle control lever 36 mounted thereon carries on its inner end a cam 113 having a detent notch 114 which actuates a lever arm 115 carried on a rock shaft 116 journaled in the knee 16 and upon which rock shaft is fixed a lever arm 117 engaging the plunger 85 of the valve 79. Movement of the control lever 36 effects the same operation of the control valve 79 as that effected in the control valve 85 by the lever 63 to thus supply lubricant fluid through the line 118, Figure 9, past the check valve 119 into the line 120 connected through a suitable flexible conduit 121 and the line 122 to the saddle lubricant distributor manifold 123 formed in the manifold block 108a.

Thus, there are two distributors 108 and 123 respectively supplied with measured amounts of lubricating fluid with each movement of the respective control levers 63 and 36. It is to be noted that both of the distributors 108 and 123 are connected to the common lubricating points ST1 to ST6 inclusive, Figure 9, the table lubricant distributor 108 being connected through line 124 to point ST1, line 125 to the points ST2 and ST4, line 126 to points ST3 and ST5, and the line 127 to the point ST6. These same points also receive lubricant supply from the saddle lubricant distributor 123 respectively through the lines 128, 129, 130 and 131. The table movement distributor also has a line 132 supplying lubricant to the point T1 for the nut and screw for the table movement and lines 133 supplying lubricant to the guideways for the table on the knee. The saddle movement distributor has a series of supply lines 134, 135, 136 and 137 which supply fluid to the guideways 18, 19, 20 and 21 for the sliding movement of the saddle on the knee. A line 138 is also provided from the distributor 123 for the point S1 of the nut and screw mechanism for actuating the saddle.

There has thus been provided a lubricating system for the moving members of a machine tool in which the manipulation of the control lever for each of the members to be operated provides a measured amount of lubricating fluid to the moving parts required to actuate the specific member being moved; common parts which are required to operate each of the members to be actuated receive lubricating fluid whenever any control member is actuated; and those portions which are only required for a particular member operated are only supplied with lubricating fluid when their respective members are actuated. Thus, in this novel lubricating system for a machine tool there has been provided an efficient lubricant distributing system of the non-return type in which lubricating fluid is supplied to the various machine parts in direct proportion to the usage required of each machine member.

What is claimed is:

1. In a machine tool having a frame, a plurality of actuable members movably mounted on said frame, actuating means for moving said members, and a control means for each of said members to effect movement or arrest movement thereof by said actuating means, the combination in a lubricating system for supplying lubricant to said members and said actuating means of lubricant fluid distributing means rendered effective by the operation of any of said control means to distribute lubricant fluid to said actuating means, and means actuable by the operation of a particular one of said control means to supply lubricant fluid solely to the particular member operated by said control means.

2. In a lubricating system for a milling machine having, a column, a knee mounted on said column, a saddle mounted on guideways for transverse movement on said knee, nut and screw operating means for actuating said saddle on said knee, a work table mounted on guideways on said saddle, nut and screw operating means for actuating said table, a common actuating transmission in said knee for driving both of said nut and screw operating means to effect movement in said saddle or table, a control means on said knee for applying or disconnecting said actuating transmission to the nut and screw operating means for said saddle, and a control means on said saddle for applying or disconnecting said actuating transmission to the nut and screw operating means for said table, the combination of a source of lubricant supply in said knee, a control valve for said lubricant supply associated with each of said control means, and a lubricant distributing system connected with said control valves whereby manipulation of either of said control levers effects distribution of lubricant to said actuating transmission and wherein manipulation of any one of said control means effects distribution of lubricant solely to the nut and screw operating mechanism and the guideways of the particular saddle or table actuated by its respective control means.

3. In a lubricating system for a knee and column type milling machine having, an actuable saddle and a table, a nut and screw actuating mechanism together with guideways for said saddle and a nut and screw actuating mechanism together with guideways for said table, a common driving transmission for said nut and screw operating mechanisms, means including a control lever for connecting or disconnecting said transmission to the nut and screw mechanism for the saddle, and a second means including a control lever for connecting or disconnecting said transmission to the nut and screw mechanism for moving the work table, the combination of a lubricant reservoir, a lubricating pump receiving its supply of lubricating fluid from said reservoir, a lubricant control valve operatively connected to each of said control levers and receiving a supply of lubricant fluid from said lubricating pump, a lubricant distributing manifold for each of said control valves, means for connecting lubricant discharge from the manifold for the control valve operated by the control lever for the saddle movement to the guideways for the knee and the nut and screw operating mechanism for actuating the saddle, means for connecting lubricant supply from the manifold for the control valve operated by the control lever for controlling the table movement to the guideways for the saddle and the nut and screw operating mechanism for actuating the table thereon, and means for connecting lubricant fluid supply from both of said manifolds to the common actuating transmission mechanism for the saddle and table.

4. In a milling machine lubricating system of the non-return type for lubricating the guideways and operating mechanism for the saddle and table members and the actuating transmission therefor, the combination of a lubricant reservoir, a lubricating fluid pressure supply pump, a pair of metering control valves connected to said pump, an actuating control lever for each of said valves, one of said control levers arranged to control the movement of said saddle by said transmission and the other of said control levers arranged to control the movement of said table by said transmission, a lubricant distributing manifold connected to each of said metering control valves, means for connecting lubricant fluid discharge from both of said manifolds to the actuating transmission for the saddle and table, means for connecting fluid supply from one of said manifolds to the saddle guideways and operating mechanism, means for connecting the other manifold to the table guideways and operating mechanism, and means whereby manipulation of one or the other of said control levers to actuate said metering valves effects distribution of fluid from said pump to said respective manifold connected thereto.

5. In a milling machine, having a column, a knee mounted on said column, a saddle mounted on guideways on said knee, nut and screw operating means for moving said saddle thereon, a work table mounted on guideways on said saddle, nut and screw operating means for effecting movement of said table thereon, a common actuating transmission in said knee for driving the nut and screw means for either said saddle or said table, and means including a control lever for each of said nut and screw means for applying or disconnecting power from said actuating transmission to effect movement of said saddle or table, a lubricating system therefore including the combination of a lubricant reservoir in said knee, a lubricant pump in said knee deriving its source of fluid from said reservoir, a lubricant fluid control valve associated with each of said control levers for the saddle and table movements, means connecting fluid supply from said pump to each of said control valves, a metering piston associated with each of said control valves whereby movement of each of said levers to an operative or an inoperative position forces a predetermined amount of lubricant through said valve from said lubricant pump, a distributing manifold block in said saddle having a pair of distributing manifolds formed therein one connected to one of said valves and the other connected to the other of said valves, means for connecting both of said manifolds to supply lubricant to said actuating transmission, means for connecting the manifold associated with the control valve operated by the control lever for the saddle to the guideways on the knee and the nut and screw means for actuating the saddle, and means for connecting the other manifold associated with the control valve operated by the lever for the table movements to the guideways on the saddle and the nut and screw means for actuating the table.

6. In a lubricating system for a machine tool having a plurality of relatively movable members, a common driving mechanism for an individual actuating mechanism for each of said members, and control means to render each of said individual actuating mechanisms operative or inoperative to move said members, the combination of means rendered effective by the operation of said control means for supplying lubricant to the common driving mechanism, and means for automatically supplying lubricant only to the particular individual actuating means put in operation for effecting movement of its respective member.

7. A lubricating system for a machine tool having a plurality of movable members, an individual actuating and guiding means for each of said members, a common driving means for said individual actuating means, means for connecting or disconnecting said common driving means relative to said individual actuating means, and an individual control means for said connecting and disconnecting means, one for each of said movable members, the combination of a source of lubricant supply, and a plurality of lubricant distributing means alternatively rendered effective by the operation of one or another of said control means to supply lubricant to said common driving means and to the respective individual actuating and guiding means of the member being controlled.

8. In a machine tool having a plurality of movable members, a main transmission, a plurality of branch transmissions for actuating said respective movable members, and individual control levers for effecting connection or disconnection of each of said branch transmissions to said main transmission, the combination in a lubricating system of a source of lubricating fluid pressure, fluid control means for said source of lubricating fluid pressure operable by said control levers, and lubricating fluid distributing means associated with said control means whereby a branch transmission is lubricated only when connected to said main transmission by manipulation of its corresponding control lever and said main transmission is lubricated whenever any of said branch transmissions are connected thereto by manipulation of any of said control levers.

9. In a machine tool having a frame, a plurality of actuable members movably mounted on said frame, actuating means for moving said members, a clutch for each of said members operable to connect or disconnect said actuating means relative to said members, a control lever for operating each of said clutches, a lubricating system for supplying lubricant to said members and said actuating means, a plurality of lubricant distributing means, and fluid control means for said distributing means each operable by the manipulation of said control levers to effect supply of lubricant to said actuating means and operable by the manipulation of a particular one of said control levers to supply lubricant to the particular member controlled by said lever.

10. In a lubricating system for a milling machine having a column, a knee mounted on said column, a saddle mounted on guideways for transverse movement on said knee, nut and screw operating means for actuating said saddle on said knee, a work table mounted on guideways on said saddle, nut and screw operating means for actuating said table, a common actuating transmission in said knee for driving both of said nut and screw operating means to effect movement in said saddle or table, a control means on said knee for applying or disconnecting said actuating transmission to the nut and screw operating means for said table, the combination of a source of lubricant supply in said knee, control valves for said lubricant supply one for each of said control means, a lubricant distributing system connected to said control valves, and actuating means interconnecting said control means and said valves so that manipulation of said control means causes distribution of lubricant to said actuating transmission, and independent manipulation of said control means causes simultaneous distribution of lubricant to said transmission and the respective nut and screw operating mechanism and guideways of the saddle or table actuated.

11. In a milling machine having a column, a knee mounted on said column, a saddle movable transversely on guideways on said knee, a work table mounted on guideways on said saddle for movement normal to the direction of movement of said saddle, a nut and screw actuating means for said saddle, a nut and screw actuating means for said table, a common actuating transmission for driving said nut and actuating means, a control means including a lever for connecting or disconnecting said actuating transmission to the nut and screw means for the saddle, and a control means including a lever for connecting or disconnecting said actuating transmission to the nut and screw means for the table, the combination of a non-return type lubricating system for said actuating transmission, nut and screw actuating means, and said guideways having means to distribute lubricant selectively to the guideways and nut and screw operating means of the particular saddle or table being actuated and simultaneously supplying lubricant to the common actuating transmission whenever either said saddle or table is actuated, and means to operate said lubricant distributing means by manipulation of the respective control levers for controlling movements in said saddle or table.

12. In a machine tool having a plurality of movable members, a main transmission, a plurality of branch transmissions for actuating said respective movable members, and means including an operating control lever for each branch transmission for connecting or disconnecting said main transmission relative to said branch transmissions, the combination in a lubricating system of a source of lubricating fluid pressure, fluid control means for said source of lubricating fluid pressure operable by said control levers, a lubricating fluid distributing means associated with said control means to supply lubricant to a branch transmission connected to said main transmission by manipulation of its corresponding control lever and to simultaneously supply lubricant to said main transmission.

13. In a machine tool having a plurality of movable members, a main transmission, a plurality of branch transmissions for actuating said respective movable members, and means including an operating control lever for each branch transmission for connecting or disconnecting said main transmission relative to said branch transmissions, the combination of a lubricating system of a source of lubricating fluid pressure, a control valve for each branch transmission operated by a corresponding control lever, means connecting said source of lubricating fluid pressure to said valves, metering pistons connected to each of said valves, a fluid distributing means connecting fluid discharge from each of said metering pistons to a corresponding branch transmission and simultaneously to said main transmission.

14. In a machine tool having a plurality of superimposed relatively movable members, a main transmission, an actuating branch transmission for each of said movable members, means for connecting or disconnecting of said branch transmissions relative to said main transmission, an individual control lever for each of said members to operate said connecting and disconnecting means, the combination in a lubricating system of a source of lubricating fluid pressure, fluid control means for said source of lubricating pressure operable by said control levers, a lubricating fluid distributing means connected to said fluid control means to supply lubricant to a branch transmission connected to said main transmission by manipulation of its corresponding control lever and to simultaneously supply lubricant to said main transmission.

EDGAR D. VANCIL.
FRED A. HASSMAN.

REFERENCES CITED

The following references are of record in the file of this patent:

UNITED STATES PATENTS

| Number | Name | Date |
|---|---|---|
| 2,248,485 | Bennett et al. | July 8, 1941 |
| 1,103,301 | La Pointe | July 14, 1914 |
| 2,190,858 | Bennett | Feb. 20, 1940 |